T. H. BUTLER & F. M. WIDERMAN.
CORN HARVESTER.
APPLICATION FILED APR. 30, 1908.
925,749.
Patented June 22, 1909.
5 SHEETS—SHEET 2.
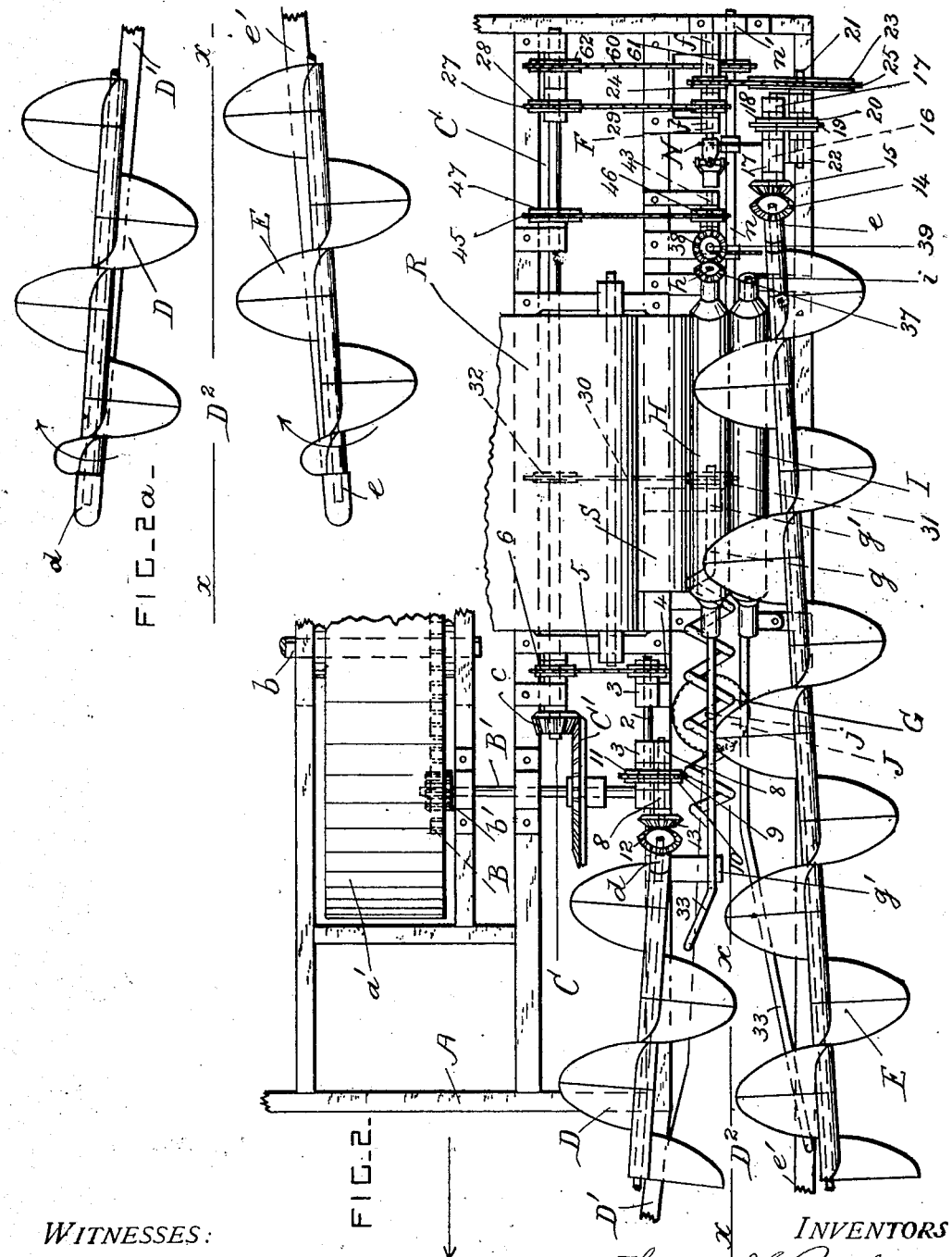
WITNESSES:
INVENTORS
Thomas H. Butler, and
Francis M. Widerman.
by Herbert W. Jenner.
Attorney T. H. BUTLER & F. M. WIDERMAN.
CORN HARVESTER.
APPLICATION FILED APR. 30, 1908.
925,749.
Patented June 22, 1909.
5 SHEETS—SHEET 3.
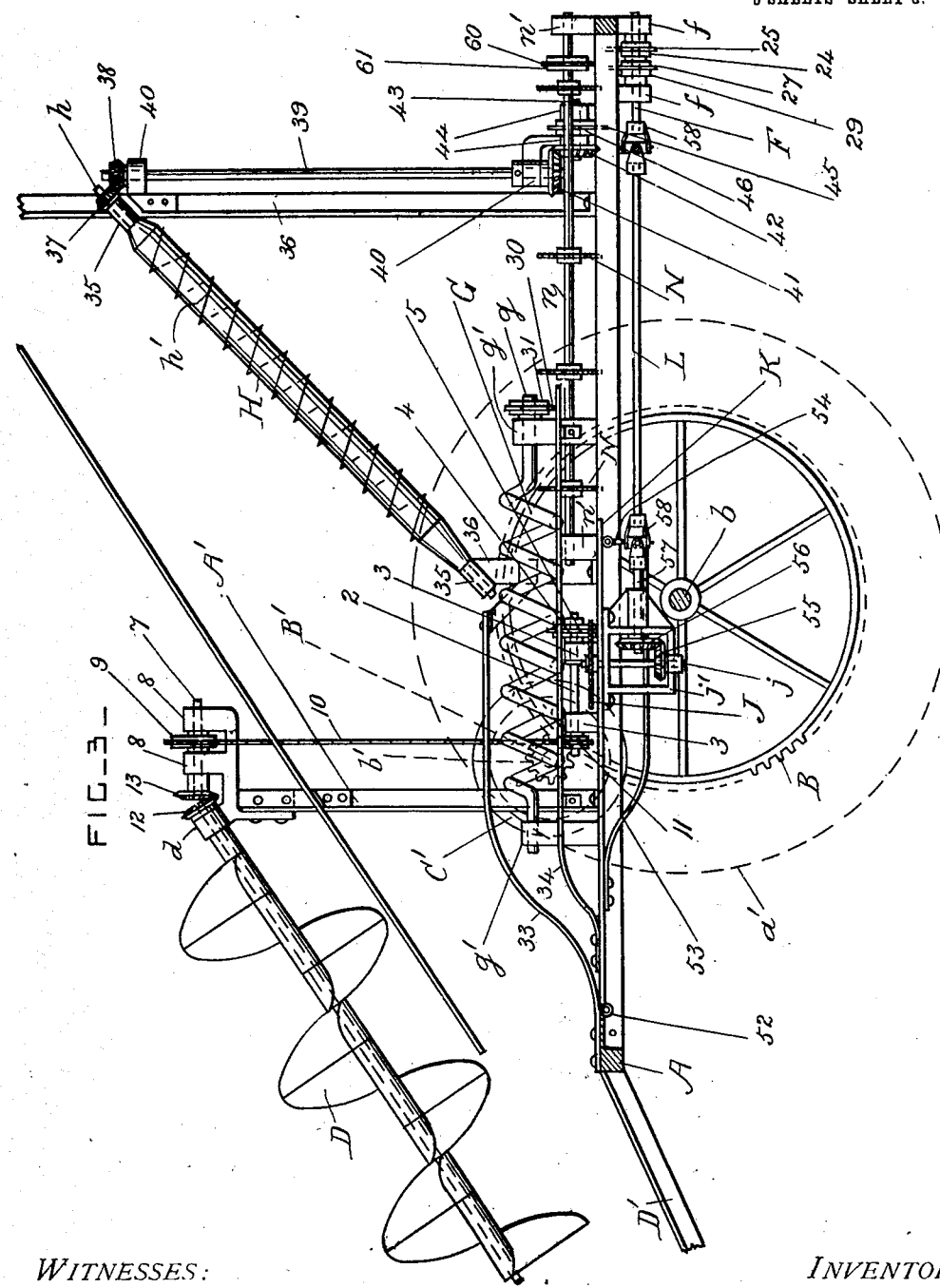
WITNESSES:
INVENTORS
Thomas H. Butler, and
Francis M. Widerman.
by Herbert W. S. Jenner.
Attorney

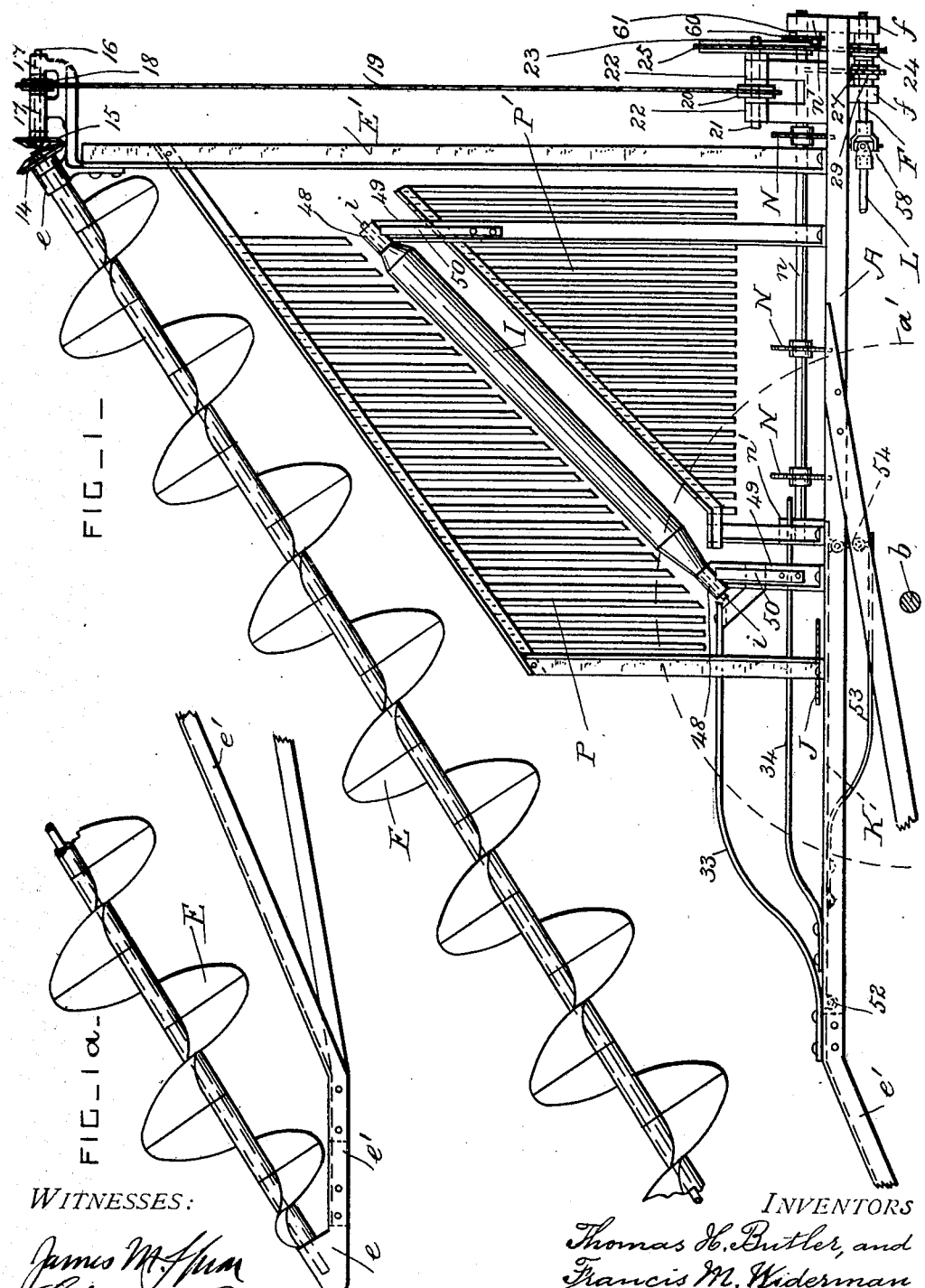

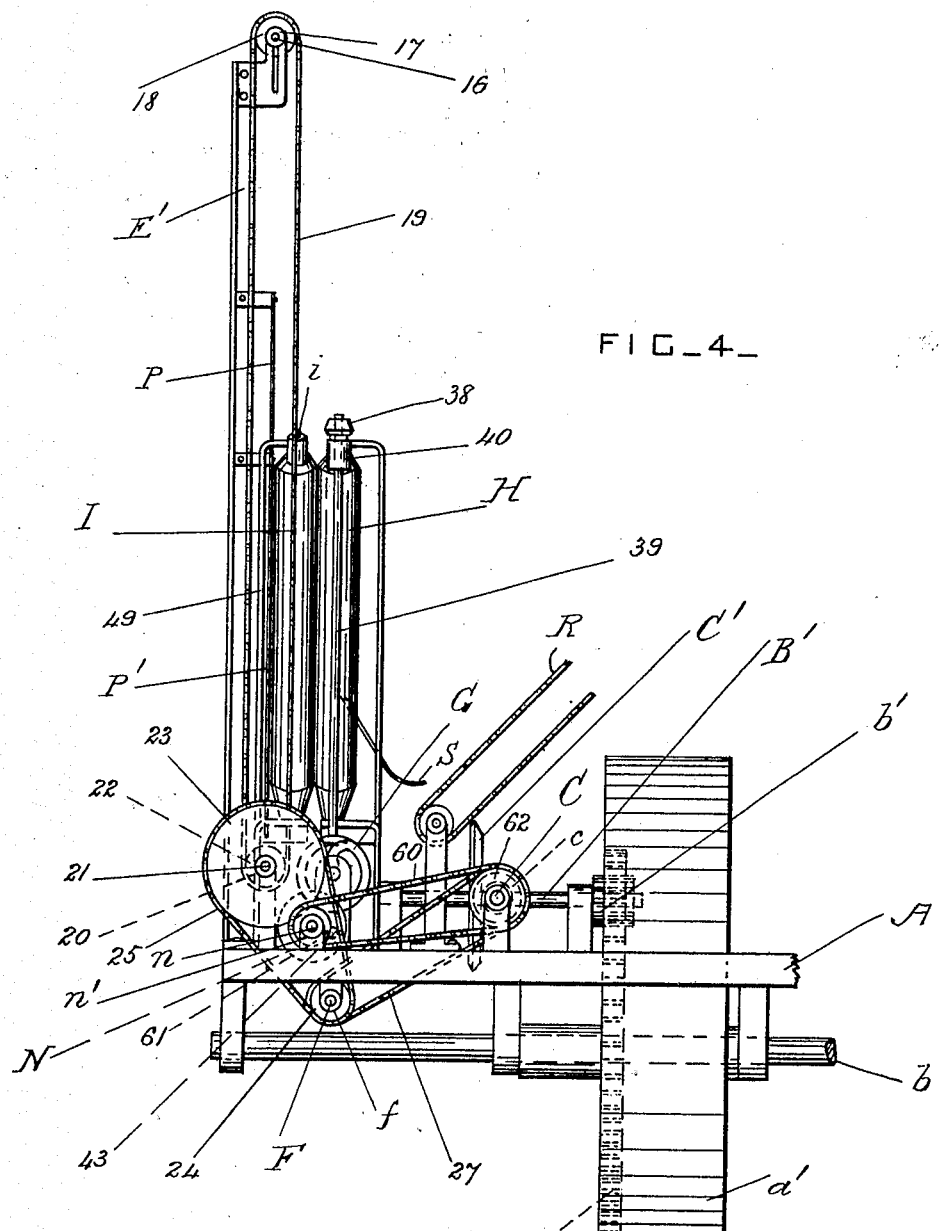

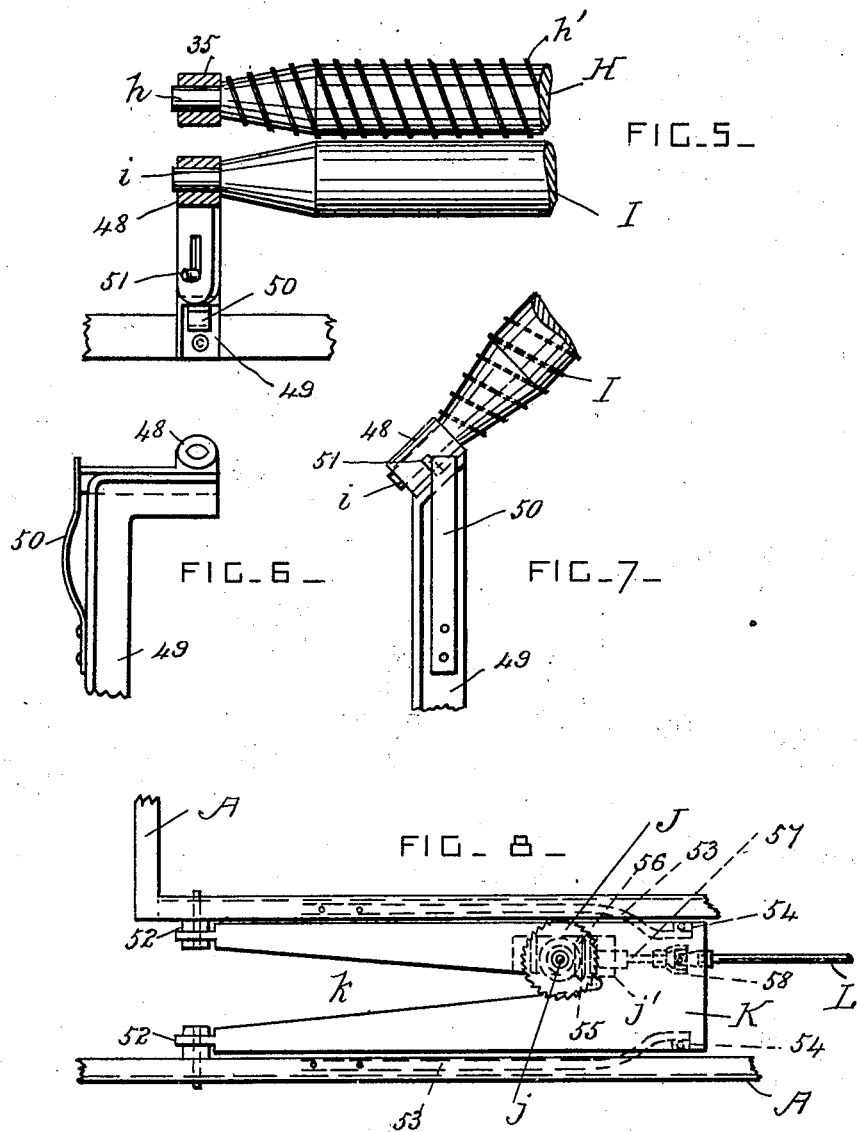

UNITED STATES PATENT OFFICE.

THOMAS H. BUTLER, OF BALTIMORE, MARYLAND, AND FRANCIS M. WIDERMAN, OF NEW YORK, N. Y.

CORN-HARVESTER.

No. 925,749.          Specification of Letters Patent.          Patented June 22, 1909.

Application filed April 30, 1908. Serial No. 430,132.

*To all whom it may concern:*

Be it known that we, THOMAS H. BUTLER, residing at Baltimore city, Maryland, and FRANCIS M. WIDERMAN, residing at New York city, in the State of New York, have invented certain new and useful Improvements in Corn-Harvesters; and we do hereby declare the following to be a full, clear, and exact description of the invention, such as will enable others skilled in the art to which it appertains to make and use the same.

This invention relates to machines for harvesting corn and separating the ears from the leaves and stalks; and it consists in the novel construction and combination of the parts hereinafter fully described and claimed.

In the drawings, Figure 1 is a side view of the principal parts of the machine, and Fig. 1$^a$ is a side view of the front end portion of the long spiral conveyer which could not be included in Fig. 1. Fig. 2 is a plan view of the principal parts of the machine, and Fig. 2$^a$ is a plan view of the front end portions of the two spiral conveyers. Fig. 3 is a longitudinal section taken on the line $x$—$x$ in Fig. 2. Fig. 4 is an end view of the principal parts of the machine. Fig. 5 is a detail view of the two snapper-rolls. Fig. 6 is a detail end view, and Fig. 7 is a detail plan view of one of the spring supports for the yieldable snapper-roll. Fig. 8 is a detail plan view of the hinged plate which supports the harvesting-saw.

A is the main frame of the machine, a portion only of which is shown. This frame is mounted on two similar ground-wheels $a'$, and is provided with draft connections or attachments of any approved construction for drawing it across the corn-field in the direction of the arrow in Fig. 2. The ground-wheel $a'$ is mounted on an axle $b$ and is provided with a toothed driving-wheel B which revolves with it.

In carrying out this invention one or more motors of approved construction, such as gas engines, may be mounted on the frame to drive any part of the machine, instead of driving all its parts from the ground-wheel.

B' is a shaft journaled in bearings secured to the frame, and having a pinion $b'$ secured on it which gears into the driving-wheel B.

C is a countershaft arranged longitudinally in the frame A and journaled in suitable bearings. The countershaft C has a beveled toothed pinion $c$ secured on it which is driven by a beveled toothed wheel C' secured on the shaft B'.

A short shaft 2 is journaled in the front part of the frame in bearings 3, parallel with the shaft C, and has a sprocket-wheel 4 secured on it. A drive-chain 5 passes over the wheel 4, and over a sprocket-wheel 6 secured on the shaft C.

A' is a vertical upright at the front part of the frame A, and 7 is a short shaft journaled in bearings 8 at its upper end. A sprocket-wheel 9 is secured on the shaft 7, and 10 is a drive-chain which passes over the wheel 9 and over a sprocket-wheel 11 secured on the shaft 2.

D is a short spiral conveyer, and E is a long spiral conveyer. These two conveyers are arranged side by side and are inclined downwardly and forwardly at an angle of about 35° with the horizontal. Their axes are also arranged at an acute angle with each other so that a converging passage D$^2$ is formed between the conveyers. The short spiral conveyer D is journaled in bearings $d$ secured to the upright A' and to a bar D' which projects forwardly from the frame A. The long spiral conveyer E is journaled in bearings $e$ which are secured to an upright E' and a projecting bar $e'$ both of which are secured to the frame A. The front and lower ends of the two conveyers are arranged to project for about the same distance at the front of the machine and are arranged a short distance above the level of the ground.

The short conveyer D is driven by a beveled toothed wheel 12 which is secured to its upper end portion, and which gears into a beveled toothed wheel 13 which is secured on the shaft 7. The two conveyers are driven in the same direction as indicated by the curved arrows in Fig. 2$^a$.

The long conveyer E is driven by means of a beveled toothed wheel 14 secured on its upper end portion, which gears into a beveled toothed wheel 15 secured on a short shaft 16, which is journaled in bearings 17 at the top of the vertical upright E' at the rear part of the frame. A sprocket-wheel 18 is secured on the shaft 16, and 19 is a drive-chain which passes over the wheel 18 and over a sprocket-wheel 20 secured on a shaft 21. The shaft 21 is journaled in bearings 22 carried by the frame A, and a large sprocket-wheel 23 is also secured on the shaft 21.

F is a short shaft journaled in bearings $f$ secured to the frame A. A sprocket-wheel 24 is secured on the shaft F, and 25 is a drive-chain which passes over the sprocket-wheel 24 and over the sprocket-wheel 23 secured on the shaft 21. The short shaft F is driven from the countershaft C by means of a drive-chain 27 which passes over a sprocket-wheel 28 secured on the countershaft C and over a sprocket-wheel 29 secured on the shaft F.

G is a spiral conveying-worm provided with a shaft $g$ which is journaled in bearings $g'$ secured to the frame A. The worm is arranged horizontally and to the rear of the short spiral conveyer D, but at a much lower level than its upper end portion. The worm is driven by means of a drive-chain 30 which passes over a sprocket-wheel 31 secured on the worm-shaft $g$, and over a sprocket-wheel 32 secured on the countershaft C.

The machine is drawn along so that the two spiral conveyers D and E straddle the row of corn, and guide-bars 33 and 34 are secured to the frame below the respective conveyers for the plants to pass between. These guide-bars may be arranged in any convenient manner, and as many of them as desired may be used to guide the corn into the machine to the best advantage.

H and I are the two snapper-rolls for separating the ears of corn from the leaves and stalks. These two rolls are provided with shafts $h$ and $i$ respectively, and are arranged side by side. The snapper-rolls are arranged in a forwardly and downwardly inclined position and at an angle of about 45° with the horizontal. The roll H is provided with sharp spiral blades or screwthreads $h'$, and its shaft $h$ is journaled in bearings 35 secured to uprights 36 which project from the frame A. The roll H is revolved continuously by means of a beveled toothed wheel 37 secured on its shaft $h$, which gears into a beveled toothed wheel 38 secured on a vertical shaft 39 which is journaled in suitable bearings 40. A beveled toothed wheel 41 is secured on the lower part of the shaft 39 and gears into a beveled toothed wheel 42 secured on a short shaft 43. The shaft 43 is journaled in bearings 44 on the frame A, and 45 is a drive-chain which passes over a sprocket-wheel 46 secured on the shaft 43 and over a sprocket-wheel 47 secured on the countershaft C.

The snapper-roll I preferably has a smooth periphery, and its shaft $i$ is journaled in spring-pressed bearings 48. These bearings are slidably supported by uprights 49 secured to the frame A, and 50 are the springs secured to the said uprights 49 and arranged to bear on the bearings 48, so that the smooth snapper-roll is pressed toward the roll H with a yielding pressure. The bearings 48 are provided with suitable stops 51 which limit the movements of the yieldable roll I.

J is the harvesting-saw which is secured on a vertical shaft $j$. This saw is arranged in front of the snapper-rolls, below the level of the worm G and a little to one side of the center of the converging passage between the two spiral conveyers. The saw shaft $j$ is journaled in a bracket $j'$ which is secured to a plate K provided with a long V-shaped notch $k$ at its front end. The forked front end of the plate K is pivoted to the frame A by hinges 52. Two similar springs 53 are secured to the frame A and normally support the hinged plate K in a horizontal position. The rear ends of the springs 53 are operatively connected with the rear part of the plate by links 54.

The harvesting-saw is revolved by means of a bevel toothed wheel 55 secured on its shaft $j$, which gears into a beveled toothed wheel 56 secured on a horizontal shaft 57 which is also journaled in the bracket $j'$.

L is a connecting-shaft provided at its ends with universal couplings or joints 58 of any approved construction which connect it with the shaft 57 and with the short shaft F' hereinbefore described.

N are saws for cutting up the leaves and stalks after the ears have been removed from them. These saws are secured on a shaft $n$ which is arranged longitudinally of the machine and journaled in bearings $n'$ on the frame A. This shaft is arranged in a horizontal plane, between and below the snapper-rolls, and is driven from the countershaft C. A drive-chain 60 passes over a sprocket-wheel 61 secured on the saw shaft $n$, and over a sprocket-wheel 62 secured on the said countershaft C.

P and P' are guides secured to the frame of the machine and arranged above and below the level of the snapper-rolls respectively. These guides each preferably consist of a series of slats secured to the frame at their upper ends so that their lower ends will spring and yield to a limited extent.

R is a portion of an elevator of any approved construction supported by the frame of the machine and driven in any approved manner.

S is a chute which receives the ears of corn from the snapper-rolls and delivers them to the elevator R. The elevator R delivers the ears of corn to a husking-machine which is also supported by the frame A and which is the subject-matter of a separate application for Letters Patent.

As the machine is drawn along, the two spiral conveyers engage with the plants and together with the spiral worm deliver them between the two snapper-rolls. The harvesting-saw cuts through the stalks when the plants are in the converging passage, and the conveyers and the worm bunch the plants together in a flattened form and carry them rearwardly and downwardly until they are seized by the snapper-rolls.

The snapper-rolls break off the ears of corn, and carry the leaves and stalks downwardly and rearwardly in a crushed mass. This crushed mass is cut up by the saws N into convenient form, and it is either collected in a suitable receptacle, if wanted for any purpose, or is discharged onto the ground to one side of the machine in a suitable form to be plowed under subsequently.

The ears of corn are delivered to the elevator R, which is arranged opposite the upper end portion of the long spiral conveyer, and at the rear end of the short spiral conveyer, on the opposite side of the snapper-rolls from the long spiral conveyer. The harvesting-saw is not broken or torn away by the plants because it and the notched plate are supported by springs which permit them to move up and down freely.

What we claim is:

1. In a corn-harvester, the combination, with a frame, and guiding-devices arranged at the front part of the frame and forming an entrance passage for the plants; of a spring-supported harvester-saw arranged in the said frame below the rear portion of the said passage and free to move up and down vertically, and driving devices for revolving the said saw.

2. In a corn-harvester, the combination, with a frame, and guiding-devices arranged at the front part of the frame and forming an entrance passage for the plants; of a spring-supported plate carried by the said frame and arranged below the said passage, said plate being free to move up and down and being provided with a longitudinal opening or notch, a harvester-saw supported by the said plate and arranged across the rear end portion of the said opening, and driving devices for revolving the said saw.

3. In a corn-harvester, the combination, with a frame, of two spiral conveyers of different length journaled side by side in the said frame, a spiral worm journaled in the said frame below the rear end of the shorter conveyer and on one side of the vertical plane passing through the rear end portion of the longer conveyer, driving devices for revolving the said conveyers and worm, and a harvester-saw journaled in the said frame below the said worm.

4. In a corn-harvester, the combination, with a frame, of guiding devices for the plants supported by the said frame and forming a rearwardly converging passage, a harvesting-saw arranged below the smaller end of the said passage, a spring-pressed support for the said saw pivoted to the said frame and free to move up and down, and driving devices for revolving the said saw.

5. In a corn-harvester, the combination, with a frame, of guiding devices for the plants supported by the said frame and forming a rearwardly converging passage, a plate having a long V-shaped notch open in front and having its front end pivoted to the said frame, a spring supporting the rear part of the said plate, a harvesting-saw supported by the rear part of the said plate and free to move up and down with it, and driving devices for revolving the said saw.

6. In a corn-harvester, the combination, with a frame, of guiding devices for the plants supported by the said frame and forming a rearwardly converging passage, a plate pivoted at its front end to the said frame, a spring supporting the rear part of the said plate, a bracket secured to the rear part of the said plate, a harvesting-saw supported by the said bracket, driving mechanism for the said saw provided with an operating shaft also supported by the said bracket, a driving shaft journaled in bearings secured to the said frame, and a shaft provided with a universal coupling at each end and connecting the two said shafts and permitting the said saw and its said driving mechanism to move up and down.

7. In a corn-harvester, the combination, with a frame, of a pair of snapper-rolls journaled in the said frame and arranged in a forwardly and downwardly inclined position, feeding devices for introducing the plants between the front end portions of the said snapper-rolls, driving devices for operating the said rolls, and a revoluble shaft provided with a series of saws for cutting up the leaves and stalks, said shaft being journaled below the said snapper-rolls.

8. In a corn-harvester, the combination, with a frame, and guiding-devices arranged at the front part of the frame and forming an entrance passage for the plants; of a plate having its front end portion pivoted to the said frame and arranged below the said passage and provided with an opening or notch, a harvester-saw supported by the said plate and arranged across the rear end portion of the said opening, a spring supporting the rear end portion of the said plate and permitting it and the saw to move up and down, driving devices for the saw carried by the said plate, a driving-shaft journaled in the said frame, and an intermediate shaft provided with universal couplings and operatively connecting the said shaft with the said driving mechanism.

9. In a corn-harvester, the combination, with a frame, of two spiral conveyers arranged side by side and journaled in the said frame, one of the said conveyers being longer than the other and extending rearwardly of it, a conveyer worm journaled in the said frame to one side of and below the rear end portion of the longer spiral conveyer, a harvester-saw arranged under the said conveyer worm, a pair of snapper-rolls journaled in the said frame and arranged between the said worm and the rear end portion of the longer spiral conveyer, and driving devices for revolving the said conveyers, worm, saw and rolls.

In testimony whereof we affix our signatures, in presence of two witnesses.

THOMAS H. BUTLER.
FRANCIS M. WIDERMAN.

Witnesses to the signature of T. H. Butler:
MARY A. MAGRAW,
WILBUR F. SMITH.

Witnesses to the signature of Francis M. Widerman:
JOHN A. SHIELDS,
BENJ. A. KELLOGG.